United States Patent
Kim

(10) Patent No.: US 12,294,982 B2
(45) Date of Patent: May 6, 2025

(54) METHOD AND DEVICE FOR TRANSMITTING INTERFERENCE INFORMATION IN WIRELESS COMMUNICATION SYSTEM

(71) Applicant: Samsung Electronics Co., Ltd., Suwon-si (KR)

(72) Inventor: Namhoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 51 days.

(21) Appl. No.: 17/768,662

(22) PCT Filed: Oct. 7, 2020

(86) PCT No.: PCT/KR2020/013630
§ 371 (c)(1),
(2) Date: Apr. 13, 2022

(87) PCT Pub. No.: WO2021/075784
PCT Pub. Date: Apr. 22, 2021

(65) Prior Publication Data
US 2024/0114494 A1    Apr. 4, 2024

(30) Foreign Application Priority Data
Oct. 14, 2019    (KR) .......................... 10-2019-0126850

(51) Int. Cl.
*H04W 72/00*    (2023.01)
*H04W 72/0453*    (2023.01)
*H04W 72/541*    (2023.01)

(52) U.S. Cl.
CPC ..... *H04W 72/0453* (2013.01); *H04W 72/541* (2023.01)

(58) Field of Classification Search
CPC ........... H04W 72/0453; H04W 72/541; H04W 72/542; H04W 72/27; H04W 72/54; H04J 11/0056
See application file for complete search history.

(56) References Cited

U.S. PATENT DOCUMENTS 8,150,443 B2    4/2012    Pedersen et al.
8,503,364 B2    8/2013    Zhang et al.
(Continued)

FOREIGN PATENT DOCUMENTS

KR    10-2010-0064279 A    6/2010
KR    10-2014-0128965 A    11/2014
(Continued)

OTHER PUBLICATIONS

3rd Generation Partnership Project; Technical Specification TS 36.423 V15.2.0 Group Radio Access Network; Evolved Universal Terrestrial Radio Access Network (E-UTRAN); X2 application protocol (X2AP), Jun. 2018.

*Primary Examiner* — Lakeram Jangbahadur
(74) *Attorney, Agent, or Firm* — Jefferson IP Law, LLP

(57) ABSTRACT

The present disclosure relates to a communication technique for combining an IoT technology with a 5G communication system for supporting a higher data transmission rate than a 4G system, and a system therefor. The present disclosure can be applied to intelligent services (for example, smart homes, smart buildings, smart cities, smart cars or connected cars, health care, digital education, retail businesses, security and safety-related services, and the like) on the basis of 5G communication technologies and IoT-related technologies. The present invention discloses a method for a base station to transmit interference information in a wireless communication system, the interference information transmission method being characterized by including the steps of: determining whether a frequency resource can be used for (Continued)

resource allocation; generating interference information indicating the interference level of the frequency resource on the basis of the determination; and transmitting the interference information to an adjacent base station, wherein the interference information about the frequency resource has a predetermined value when the frequency resource is not used for resource allocation.

9 Claims, 17 Drawing Sheets

(56) References Cited

U.S. PATENT DOCUMENTS

| | | | |
|---|---|---|---|
| 8,538,450 | B2 | 9/2013 | Zhang et al. |
| 8,571,594 | B2 | 10/2013 | Luo et al. |
| 8,660,600 | B2 | 2/2014 | Khandekar et al. |
| 8,976,729 | B2 | 3/2015 | Luo et al. |
| 9,515,790 | B2 | 12/2016 | Lee et al. |
| 9,948,437 | B2 | 4/2018 | Seo et al. |
| 2010/0234061 | A1 | 9/2010 | Khandekar et al. |
| 2011/0013523 | A1 | 1/2011 | Ding et al. |
| 2011/0013560 | A1 | 1/2011 | Zhang et al. |
| 2011/0013582 | A1 | 1/2011 | Ding et al. |
| 2011/0014940 | A1 | 1/2011 | Zhang et al. |
| 2011/0039595 | A1 | 2/2011 | Luo et al. |
| 2011/0044247 | A1 | 2/2011 | Luo et al. |
| 2011/0188472 | A1 | 8/2011 | Jeon et al. |
| 2014/0119319 | A1 | 5/2014 | Manssour |
| 2015/0003272 | A1* | 1/2015 | Hu ............... H04W 24/02 370/252 |
| 2016/0278062 | A1* | 9/2016 | Hunukumbure .... H04W 72/543 |

FOREIGN PATENT DOCUMENTS

| | | | | |
|---|---|---|---|---|
| KR | 20140128965 A | * | 11/2014 | ............ H04B 7/024 |
| WO | WO-2012105766 A2 | * | 8/2012 | ............ H04J 11/005 |

* cited by examiner

FIG. 4

| IE/Group Name | Presence | Range | IE type and reference | Semantics description |
|---|---|---|---|---|
| HII | M | | BIT STRING (1..110, ...) | Each position in the bitmap represents a PRB (first bit=PRB 0 and so on), for which value "1" indicates 'high interference sensitivity' and value "0" indicates 'low interference sensitivity'. The maximum number of Physical Resource Blocks is 110. |

| IE/Group Name | Presence | Range | IE type and reference | Semantics description |
|---|---|---|---|---|
| UL Interference Overload Indication List | | 1..<maxnoofPRBs> | | |
| >UL Interference Overload Indication | M | | ENUMERATED<br>610 (high interference,<br>620 medium interference,<br>630 low interference, ...) | Each PRB is identified by its position in the list: the first element in the list corresponds to PRB 0, the second to PRB 1, etc. |

| Range bound | Explanation |
|---|---|
| maxnoofPRBs | Maximum no. Physical Resource Blocks. Value is 110. |

FIG. 10

| IE/Group Name | Presence | Range | IE type and reference | Semantics description |
|---|---|---|---|---|
| UL Interference Overload Indication List | | 1..<maxnoofPRBS> | | |
| >UL Interference Overload Indication | M | | ENUMERATED (high interference, medium interference, low interference, ignore, ...) | Each PRB is identified by its position in the list: the first element in the list corresponds to PRB 0, the second to PRB 1, etc. |

1010 — high interference
1020 — medium interference
1030 — low interference
1040 — ignore

| Range bound | Explanation |
|---|---|
| maxnoofPRBS | Maximum no. Physical Resource Blocks. Value is 110. |

| IE/Group Name | Presence | Range | IE type and reference | Semantics description |
|---|---|---|---|---|
| UL Interference Overload Indication List | | 1..<maxnoofPRBs> | | |
| >UL Interference Overload Indication | M | | ENUMERATED [<br>high interference-data, — 1310<br>medium-interference-data — 1320<br>low-interference-data — 1330<br>ignore, — 1340<br>high interference-ctrl — 1350<br>medium-interference-ctrl — 1360<br>low-interference-ctrl — 1370<br>...] | Each PRB is identified by its position in the list: the first element in the list corresponds to PRB 0, the second to PRB 1, etc. |

| Range bound | Explanation |
|---|---|
| maxnoofPRBs | Maximum no. Physical Resource Blocks. Value is 110. |

METHOD AND DEVICE FOR TRANSMITTING INTERFERENCE INFORMATION IN WIRELESS COMMUNICATION SYSTEM

TECHNICAL FIELD

The disclosure relates to an uplink interference control method in a wireless communication system. More particularly, to a method and apparatus for transmitting interference information for performance improvement of an uplink interference coordination scheme.

BACKGROUND ART

In order to satisfy wireless data traffic demands that tend to increase after 4G communication system commercialization, efforts to develop an enhanced 5G communication system or a pre-5G communication system are being made. For this reason, the 5G communication system or pre-5G communication system is called a beyond 4G network communication system or a post LTE system.

In order to achieve a high data transfer rate, an implementation of the 5G communication system in a mmWave band (e.g., 60 Giga (60 GHz) band) is taken into consideration. In order to reduce a path loss of a radio wave and increase the transfer distance of a radio wave in the mmWave band, beamforming, massive MIMO, full dimensional MIMO (FD-MIMO), an array antenna, analog beamforming and large scale antenna technologies are being discussed in the 5G communication system. Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (COMP), and reception interference cancellation, are being developed in the 5G communication system. In addition, hybrid FSK and QAM modulation (FQAM) and sliding window superposition coding (SWSC) that are advanced coding modulation (ACM) schemes, and filter bank multi-carrier (FBMC), non-orthogonal multiple access (NOMA) and sparse code multiple access (SCMA), that is, advanced access technologies, are being developed in the 5G system.

Meanwhile, the Internet evolves from a human-centered connection network over which human generates and consumes information to Internet of things (IoT) through which information is exchanged and processed between distributed elements, such as things. An Internet of everything (IoE) technology in which a big data processing technology through a connection with a cloud server is combined with the IoT technology is emerging. In order to implement the IoT, technical elements, such as the sensing technology, wired/wireless communication and network infrastructure, service interface technology and security technology, are required. Accordingly, technologies, such as a sensor network, machine to machine (M2M) and machine type communication (MTC) for a connection between things, are recently researched. In the IoT environment, an intelligent Internet technology (IT) service in which a new value is created for human life by collecting and analyzing data generated from connected things may be provided. The IoT may be applied to fields, such as a smart home, a smart building, a smart city, a smart car or a connected car, a smart grid, health care, smart home appliances, and advanced medical services, through convergence and composition between the existing information technology (IT) and various industries.

Accordingly, various attempts to apply the 5G communication system to the IoT are being made. For example, technologies, such as a sensor network, machine to machine (M2M) and machine type communication (MTC), are implemented by schemes, such as beamforming, MIMO, and an array antenna, that is, 5G communication technologies. The application of a cloud radio access network (cloud RAN) as the aforementioned big data processing technology may be said to be an example of convergence between the 5G technology and the IoT technology.

In a communication system, inter-cell interference coordination (ICIC) in uplink is a scheme for improving performance of a weak electric field terminal. Various methods of reducing an ICI level by coordinating output power of a terminal or avoiding mutual interference by allocating weak electric field terminals to different resource regions between cells are used as the scheme. A 4G communication system according to the $3^{rd}$ generation partnership project (hereinafter referred to as "3GPP") provides an uplink (UL) interference overload indication (IOI) message or a high interference indication (HII) message in order to support an uplink ICIC function. Each base station may exchange UL IOI or HII message information through an X2 interface and check an uplink interference level experienced by cells within different base stations.

That is, the ICIC technology may be different in a detailed implementation method thereof, but is basically a technology capable of obtaining performance improvement of a weak electric field terminal by incorporating, into uplink scheduling, ICIC standard information (HII, OI) based on interference quantity measurement.

However, HII or IOI information used in a current standard is very limited information having a 1- or 2-bit size and does not have an uplink interference characteristic for each channel properly incorporated therein. Accordingly, there is a problem in that a gain is limited in a capacity improvement aspect of a weak electric field terminal or a capacity improvement aspect of the entire cell through a base station operation using the existing ICIC standard information.

DISCLOSURE OF INVENTION

Technical Problem

The disclosure relates to a method and apparatus for providing extended interference information while maintaining compatibility with the existing 3GPP standard.

Specifically, a channel corresponding to each frequency resource can be divided into a data channel and a control channel. Interference information from which an interference level has been separated for each channel can be provided. Interference information for an unused frequency resource or a frequency resource required to be excluded can be provided.

Solution to Problem

A method of transmitting, by a base station, interference information in a wireless communication system according to various embodiments of the disclosure includes identifying whether a frequency resource is available for resource allocation, generating interference information indicative of an interference level of the frequency resource based on the identification, and transmitting the interference information to an adjacent base station. The interference information of the frequency resource has a predetermined value based on the frequency resource being not used for resource allocation.

A method of receiving, by a base station, interference information in a wireless communication system according to various embodiments of the disclosure includes receiving, from an adjacent base station, interference information indicative of an interference level of a frequency resource, generating scheduling information based on the interference information, and transmitting the scheduling information to a user equipment. Whether a frequency resource is available for resource allocation is able to be identified based on the received interference information.

A base station transmitting interference information in a wireless communication system according to various embodiments of the disclosure includes a transceiver and at least one processor. The processor may be configured to identify whether a frequency resource is available for resource allocation, generate interference information indicative of an interference level of the frequency resource based on the identification, and control the transceiver to transmit the interference information to an adjacent base station. The interference information of the frequency resource may have a predetermined value based on the frequency resource being not used for resource allocation.

A base station receiving interference information in a wireless communication system according to various embodiments of the disclosure includes a transceiver and at least one processor. The processor may be configured to control the transceiver to receive, from an adjacent base station, interference information indicative of an interference level of a frequency resource, to generate scheduling information based on the interference information, to control the transceiver to transmit the scheduling information to a user equipment, and to identify whether the frequency resource is available for resource allocation based on the received interference information.

Advantageous Effects of Invention

According to various embodiments of the disclosure, an interference level can be checked for each channel of each cell because values of interference information of frequency resources are divided for each channel.

Furthermore, according to various embodiments of the disclosure, interference of a neighbor cell can be more accurately checked because a value of interference information of a specific resource in terms of an operation is excluded.

BRIEF DESCRIPTION OF DRAWINGS

FIG. 4 is a diagram illustrating a configuration of high interference indicator (HII) information, that is, an example of conventional interference information.

FIG. 6 is a diagram illustrating a configuration of IOI information, that is, an example of conventional interference information.

FIG. 10 is a diagram illustrating a configuration of the first type of interference information according to various embodiments of the disclosure.

FIG. 13 is a diagram illustrating a configuration of the second type of interference information according to various embodiments of the disclosure.

MODE FOR THE INVENTION

Figure 1:
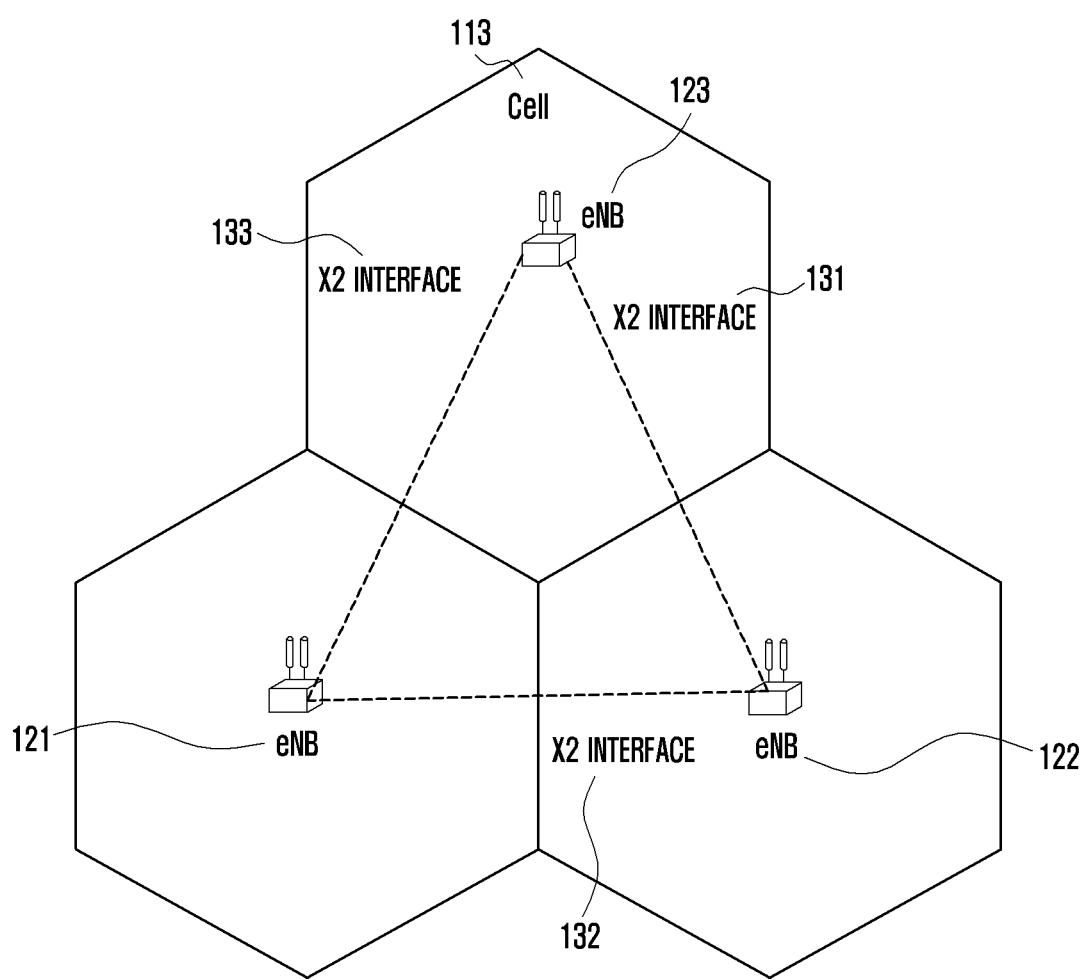
FIG. 1 is a network configuration diagram of a wireless communication system connected by X2 interfaces according to various embodiments of the disclosure.

Advantages and characteristics of the disclosure and a method for achieving the advantages and characteristics will become apparent from the embodiments described in detail in conjunction with the accompanying drawings. However, the disclosure is not limited to the disclosed embodiments, but may be implemented in various different forms. The embodiments are provided to only complete the disclosure and to fully notify a person having ordinary knowledge in the art to which the disclosure pertains of the category of the disclosure. The disclosure is defined by the category of the claims. Throughout the specification, the same reference numerals denote the same components.

In the disclosure, it will be understood that each block of the flowchart illustrations and combinations of the blocks in the flowchart illustrations can be executed by computer program instructions. These computer program instructions may be mounted on the processor of a general purpose computer, a special purpose computer, or other programmable data processing equipment, so that the instructions executed by the processor of the computer or other programmable data processing equipment create means for executing the functions specified in the flowchart block(s). These computer program instructions may also be stored in a computer-usable or computer-readable storage medium that can direct a computer or other programmable data processing equipment to implement a function in a particular manner, such that the instructions stored in the a computer-usable or computer-readable memory produce an article of manufacture including instruction means that implement the function specified in the flowchart block(s). The computer program instructions may also be loaded on a computer or other programmable data processing equipment to cause a series of operational steps to be performed on the computer or other programmable data processing equipment to produce a computer-executed process, so that the instructions performing the computer or other programmable data processing equipment provide steps for executing the functions described in the flowchart block(s).

Furthermore, each block of the flowchart illustrations may represent a portion of a module, a segment, or code, which includes one or more executable instructions for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

In this case, the term "unit," as used in the present embodiment means software or a hardware component, such as an FPGA or an ASIC, and the "unit" performs specific tasks. However, the term "unit" does not mean that it is limited to software or hardware. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate on one or more CPUs within a device or a security multimedia card. Furthermore, in an embodiment, "~unit" may include one or more processors.

Hereinafter, an operation principle of the disclosure is described in detail with reference to the accompanying drawings. In the following description of the disclosure, a detailed description of a related known function or configuration will be omitted if it is deemed to make the subject matter of the disclosure unnecessarily vague. Hereinafter, embodiments of the disclosure are described with reference to the accompanying drawings. Furthermore, terms to be described hereinafter may be defined by taking into consideration functions in the disclosure, and may be different depending on a user, an operator's intention or practice. Accordingly, each term should be defined based on contents over the entire specification.

Hereinafter, in the disclosure, terms and names defined in long term evolution (LTE) of the $3^{rd}$ generation partnership project (hereinafter referred to as "3GPP") and a new radio (NR) standard are used for convenience of description. However, the disclosure is not limited to the terms and names and may be identically applied to a system according to another standard.

Hereinafter, a term for identifying a connection node, a term to denote a network entity, terms to denote messages, a term to denote an interface between network entities, terms to denote various types of identification information, etc., which are used in the description, have been exemplified for convenience of description. Accordingly, the disclosure is not limited to terms described later, and another term to denote a target having an equivalent technical meaning may be used. For example, in the following description, a terminal may refer to a MAC entity within a terminal present for each master cell group (MCG) and secondary cell group (SCG) to be described later.

In this specification, a base station has a meaning as a terminal node of a network that directly performs communication with a terminal. A specific operation described as being performed by a base station in this document may be performed by an upper node of a base station according to circumstances. That is, it is evident that in a network consisting of multiple network nodes including a base station, various operations performed for communication with a terminal may be performed by a base station or other network nodes other than the base station. A "base station (BS)" may be substituted with a term, such as a fixed station, a Node B, an evolved-NodeB (eNB), a base transceiver system (BTS), or an access point (AP). Furthermore, a "terminal" may be fixed or may have mobility, and may be substituted with a term, such as a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, or a device-to-device (D2D) device.

Hereinafter, downlink (DL) means communication from a base station to a terminal, and uplink (UL) means communication from a terminal to a base station. In downlink, a transmitter may be a part of a base station, and a receiver may be a part of a terminal. In uplink, a transmitter may be a part of a terminal, and a receiver may be a part of a base station.

Furthermore, hereinafter, an embodiment of the disclosure is described by taking an LTE, LTE-A, LTE Pro or 5G (or NR, a next-generation mobile communication) system as an example, but an embodiment of the disclosure may also be applied to another communication system having a similar technical background or channel form. Furthermore, an embodiment of the disclosure may also be applied to another communication system through some modifications without greatly departing from the scope of the disclosure based on a determination of a person having skilled technical knowledge.

Methods according to embodiments written in the claims or specification of the disclosure may be implemented in the form of hardware, software, or a combination of hardware and software.

If a method is implemented as software, a computer-readable storage medium storing one or more programs (software module) may be provided. The one or more programs stored in the computer-readable storage medium are configured for being executable by one or more processors within an electronic device. The one or more programs include instructions that enable the electronic device to execute methods according to embodiments, which are written in the claims or specification of the disclosure.

Such a program (software module or software) may be stored in a random access memory, a non-volatile memory including a flash memory, a read-only memory (ROM), an electrically erasable programmable read-only memory (EEPROM), a magnetic disc storage device, a compact disc-ROM (CD-ROM), digital versatile discs (DVDs) or other types of optical storage devices, or a magnetic cassette. Alternatively, the program (software module or software) may be stored in a memory consisting of a combination of all or some of them. Furthermore, multiple configuration memories may be included.

Furthermore, the program may be stored in an attachable storage device which may be accessed over a communication network, such as the Internet, Intranet, a local area network (LAN), a wide LAN (WLAN), or a storage area network (SAN), or a communication network consisting of a combination of them. Such a storage device may access a device that performs an embodiment of the disclosure through an external port. Furthermore, a separate storage device in a communication network may access a device that performs an embodiment of the disclosure.

In the aforementioned detailed embodiments of the disclosure, the components included in the disclosure have been expressed in the singular or plural form depending on a proposed detailed embodiment. However, the singular or plural expression has been selected suitably for a situation proposed for convenience of description, and the disclosure is not limited to singular or plural components. Although a component has been expressed in the plural form, it may be configured in the singular form. Although a component has been expressed in the singular form, it may be configured in the plural form.

Although the detailed embodiments have been described in the detailed description of the disclosure, the disclosure may be modified in various ways without departing from the scope of the disclosure. Accordingly, the scope of the disclosure should not be limited to the aforementioned embodiments, but should be defined by not only the claims, but equivalents thereof.

Hereinafter, an operation principle of the disclosure is described in detail with reference to the accompanying drawings. In the following description of the disclosure, a detailed description of a related known function or configuration will be omitted if it is deemed to make the subject matter of the disclosure unnecessarily vague. Furthermore, terms to be described hereinafter may be defined by taking into consideration functions in the disclosure, and may be different depending on a user, an operator's intention or practice. Accordingly, each term should be defined based on contents over the entire specification.

In the following description of the disclosure, a detailed description of a related known function or configuration will be omitted if it is deemed to make the subject matter of the disclosure unnecessarily vague. Hereinafter, embodiments of the disclosure are described with reference to the accompanying drawings.

FIG. 1 is a network configuration diagram of a wireless communication system connected by X2 interfaces according to various embodiments of the disclosure.

With reference to FIG. 1, the wireless communication system includes base stations 121, 122, and 123. Each of the base stations has a cell. For example, the base station 123 has a cell 113. The base stations may communicate with one another through X2 interfaces 231, 232, and 233.

In order to perform uplink inter-cell interference coordination (ICIC), the base stations 121, 122, and 123 deliver interference information to other base stations 121, 122, and 123 through the X2 interfaces 131, 132, and 133.

For example, the interference information delivered among the base stations may include one or more of high interference indicator (HII) information using a pro-active method and overload indicator (OI) information using a reactive method.

The HII is information using a pro-active method, which previously notifies, by the base station 121, a neighbor cell that high interference will be applied. In general, according to power control policies discussed in the LTE standard, for example, a fractional power control method and a transmit power control (TPC) command in a physical downlink control channel (PDCCH), a base station is aware of power of a terminal. Accordingly, the base station may configure a value 0 or 1 in each PRB based on a given threshold with respect to power of the terminal allocated to each PRB. In this case, 0 means low interference, and 1 means high interference. Neighbor cells that have received HII information from a specific cell every ICIC period allocate resources to weak electric field terminals served by the corresponding cells so that a resource collision against a specific resource block (RB) in which HII information has been delivered is avoided upon allocation of the resources. A specific target cell ID may be transmitted along with HII information. In this case, a target cell to which bit information indicative of a degree of sensitivity of interference of the PRB is applied is designated. If HII for which a specific target cell has not been designated is used for base station uplink scheduling, a scheduling gain may be greatly degraded.

Figure 2:
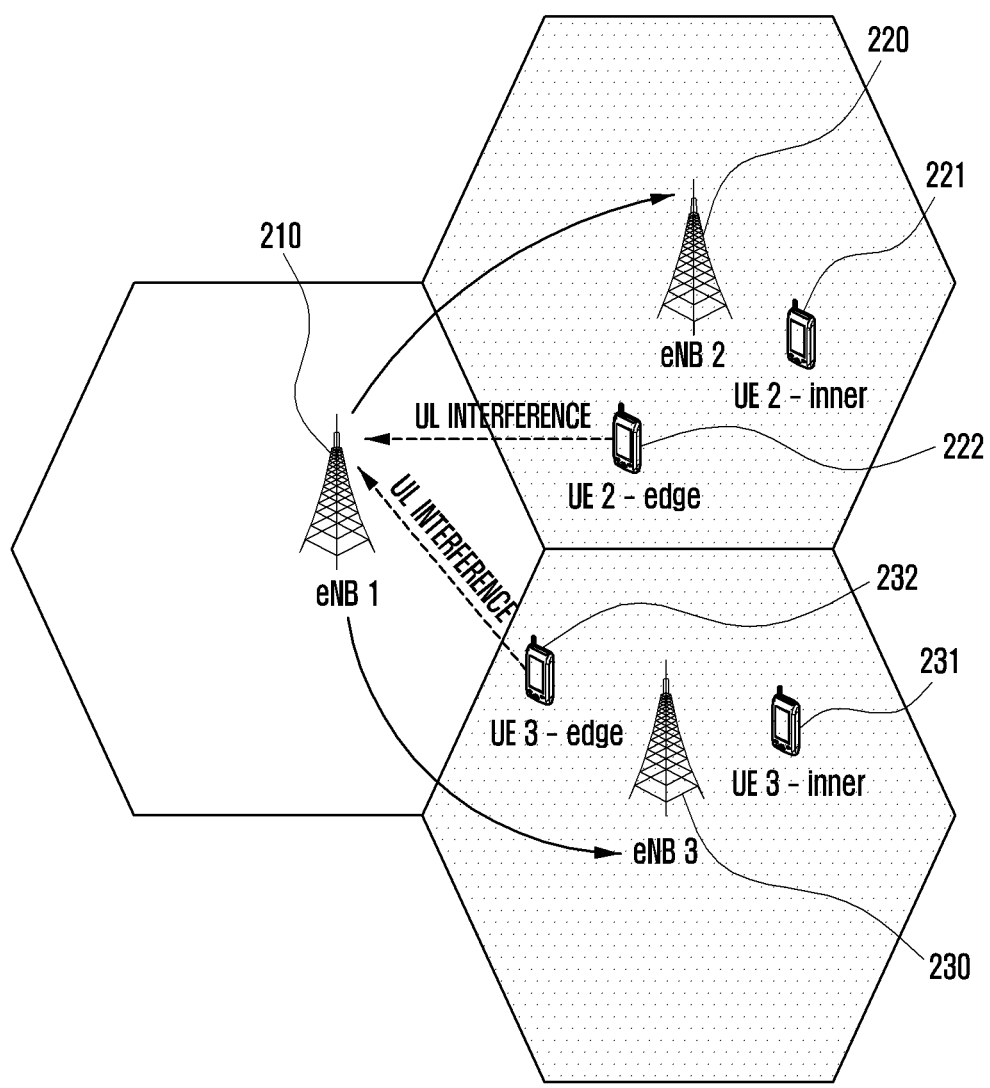
FIG. 2 is a network configuration diagram of a mobile communication system using interference overload indicator (IOI) information according to various embodiments of the disclosure.

FIG. 2 is a network configuration diagram of a mobile communication system using interference overload indicator (IOI) information according to various embodiments of the disclosure.

Overload indicator (OI) information according to various embodiments of the disclosure may include interference overload indication (IOI).

With reference to FIG. 2, the mobile communication system includes a first base station 210, a second base station 220 and a third base station 230. A second weak electric field terminal 222 is disposed at the boundary of coverage of the second base station 220 and coverage of the first base station 210. A second inner terminal 221 is disposed within (a location far from the boundary) the coverage of the second base station 220. A third weak electric field terminal 232 is disposed at the boundary of coverage of the third base station 230 and the coverage of the first base station 210. A third inner terminal 231 is disposed within the coverage of the third base station 230.

The first base station 210 may measure the size of interference received with respect to each resource block (RB), and may notify the neighbor cells 220 and 230 of overload indication (OI) through X2 interfaces.

OI is information using a reactive method. Interference received by the first base station 210 is basically interference attributable to the weak electric field terminals 222 and 232. According to a current LTE standard, the first base station 210 may transmit the size of interference to the neighbor cells 220 and 230 by indicating the size of interference as high, medium, or low with respect to each PRB. The first base station 210 stores OI information most recently transmitted to the neighbor cells 220 and 230, and broadcasts OI to the neighbor cells 220 and 230 when an OI value of an RB is changed. Basically, an interference over thermal noise (IoT) control technology for coordinating power of weak electric field terminals using the same band by measuring an interference quantity from a neighbor cell may be used to guarantee uplink cell coverage of each cell. Alternatively, as if HII is used for scheduling, OI information using a reactive method may be used for uplink scheduling.

An ICIC technology may be different in a detailed implementation method thereof, but is basically a technology capable of obtaining performance improvement of a weak electric field terminal by incorporating, into uplink scheduling, ICIC standard information (HII, OI) based on interference quantity measurement.

However, HII or IOI information used in a current standard is very limited information having a several-bit size and does not have an uplink interference characteristic for each channel properly incorporated therein. Accordingly, there is a problem in that a function of the ICIC technology is limited in a capacity improvement aspect of a weak electric field terminal or a capacity improvement aspect of the entire cell. This is described in detail with reference to FIGS. 4 to 7.

Figure 3:
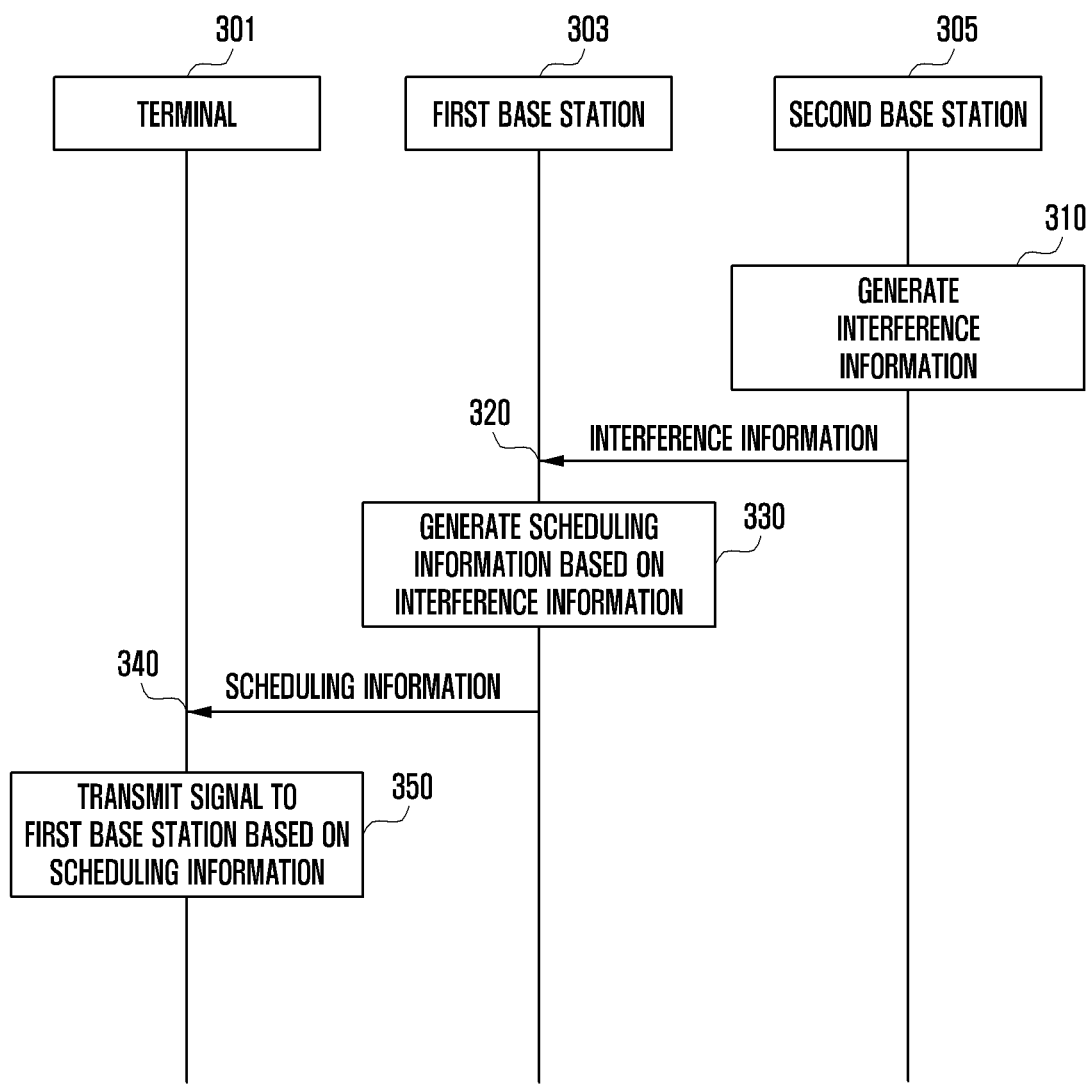
FIG. 3 is a flowchart illustrating an operation of transmitting interference information between base stations in a mobile communication system according to various embodiments of the disclosure.

FIG. 3 is a flowchart illustrating an operation of transmitting interference information between base stations in a mobile communication system according to various embodiments of the disclosure.

As illustrated in FIG. 3, the mobile communication system to which the ICIC technology is applied may include a terminal, a first base station, and a second base station.

The second base station may generate interference information in operation 310, and may transmit the interference information to the first base station in operation 320.

For example, the interference information received by the first base station is information indicative of a level of interference for each physical resource block (PRB), and may include at least one of HII information or IOI information.

Interference information according to various embodiments of the disclosure may be generated by taking into consideration whether a corresponding frequency resource is available for resource allocation (e.g., whether a frequency resource is an unused frequency resource or a frequency resource required to be excluded in terms of an operation).

Furthermore, interference information may be generated based on channel information corresponding to a frequency resource. Accordingly, interference information according to various embodiments of the disclosure may provide an interference level for each channel.

Accordingly, the first base station according to various embodiments of the disclosure may check an interference level for each channel of each cell based on the interference information received from the second base station, and can more accurately check interference of a neighbor cell by excluding an IOI value of a specific resource in terms of an operation even within the same channel.

The first base station may generate scheduling information based on the interference information received from the second base station in operation 330, and may transmit the scheduling information to the terminal in operation 340.

For example, the first base station may generate scheduling information based on interference information into which an interference level between cells belonging to the second base station has been more accurately incorporated.

In operation 340, the terminal may transmit a signal to the first base station based on the scheduling information received from the first base station.

For example, the terminal may reduce an ICI level by coordinating uplink output power based on the scheduling information received from the first base station.

Furthermore, the terminal may avoid mutual interference by performing uplink transmission by using different resource regions between cells based on the scheduling information received from the first base station.

Accordingly, PRB regions in which channel information and an IOI value for each PRB may be ignored can be distinguished through interference information according to various embodiments of the disclosure. Accordingly, interference information between cells belonging to the second base station can be more accurately shared, and a data transfer rate and coverage can be improved through interference control and resource allocation operations of the first base station by taking the interference information into consideration.

FIG. 4 is a diagram illustrating a configuration of high interference indicator (HII) information, that is, an example of conventional interference information.

According to a current LTE standard, a base station may configure a value 0 or 1 in each PRB based on a given threshold with respect to power of a terminal allocated to each PRB. In this case, 0 means low interference, and 1 means high interference.

As illustrated in FIG. 4, in an HII 400, interference information of each PRB unit is represented as a 1-bit bit string 410. 0 and 1 mean high interference and low interference, respectively. There is an advantage in that the amount of information exchanged between base stations is small, but there is a disadvantage in that delivered information is simplified. HII information follows an order of mapping with a PRB. That is, the first HIT information is a value corresponding to the first PRB.

Figure 5:
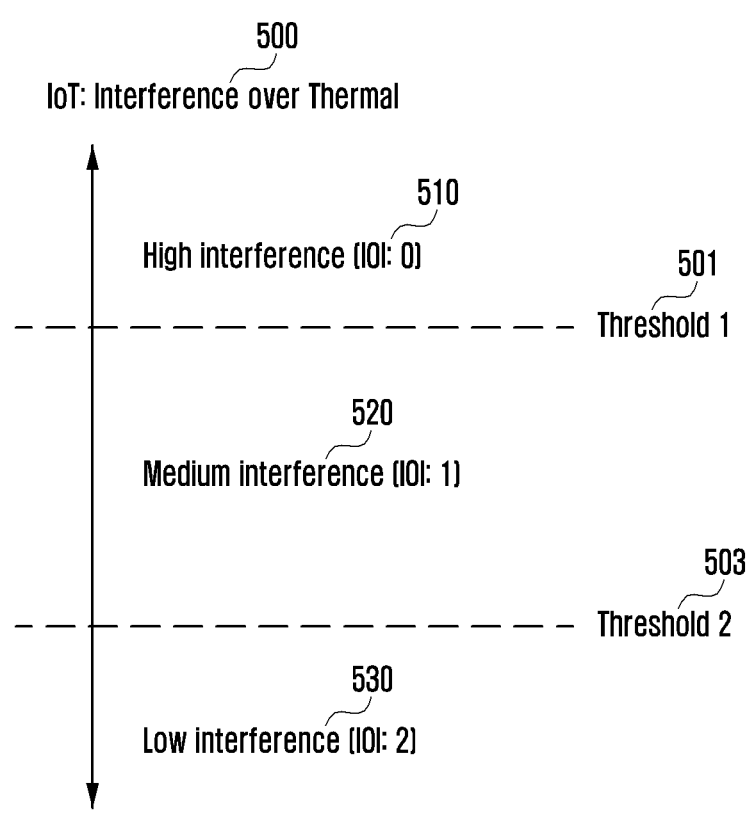
FIG. 5 is a diagram illustrating values of conventional interference information.

FIG. 5 is a diagram illustrating values of conventional interference information.

FIG. 5 relates to the interference over thermal noise (IoT) control technology for controlling power of weak electric field terminals using the same band by measuring an interference quantity from a neighbor cell.

According to a current LTE standard, a base station may measure the size of interference received with respect to each RB, and may notify the neighbor cells 220 and 230 of IOI through the X2 interfaces. The IOI may be transmitted to the neighbor cells by indicating the size of interference as high, medium, or low with respect to each PRB.

As illustrated in FIG. 5, in order to identify the size of interference as one of three states of high interference 510, medium interference 520, and low interference 530 with respect to each PRB, two thresholds threshold1 501 and threshold1 503 may be configured. Each of the thresholds is an implementation issue not a standard.

Meanwhile, as illustrated in FIG. 5, the length of IOI may be 2 bits. With respect to each PRB, an IOI value may be 0 when the size of interference is high interference, an IOI value may be 1 when the size of interference is medium interference, and an IOI value may be 2 when the size of interference is low interference.

FIG. 6 is a diagram illustrating a configuration of IOI information, that is, an example of conventional interference information.

In a current LTE standard, in an uplink IOI, the size of interference may be indicated as high, medium, or low with respect to each PRB.

As illustrated in FIG. 6, in IOI 600, interference information of each PRB unit may be represented as 2 bits, 0 may mean high interference 610, 1 may mean medium interference 620, and 2 may mean low interference 630.

The amount of information delivered is much compared to HII, but a scheduler can more accurately check an interference level and IOI information follows an order of mapping with a PRB as in HII. That is, the first IOI information is a value corresponding to the first PRB.

Table 1 below is an example of corresponding IOI information.

TABLE 1

```
UL-InterferenceOverloadIndication : : = SEQUENCE
(SIZE(1..maxnoofPRBs))
            OF UL-InterferenceOverloadIndication-Item
UL-InterferenceOverloadIndication-Item : : = ENUMERATED {
   high-interference,      // 00 : 0
   medium-interference,    // 01 : 1
   low-interference,       // 10 : 2
   ...
}
```

Figure 7:
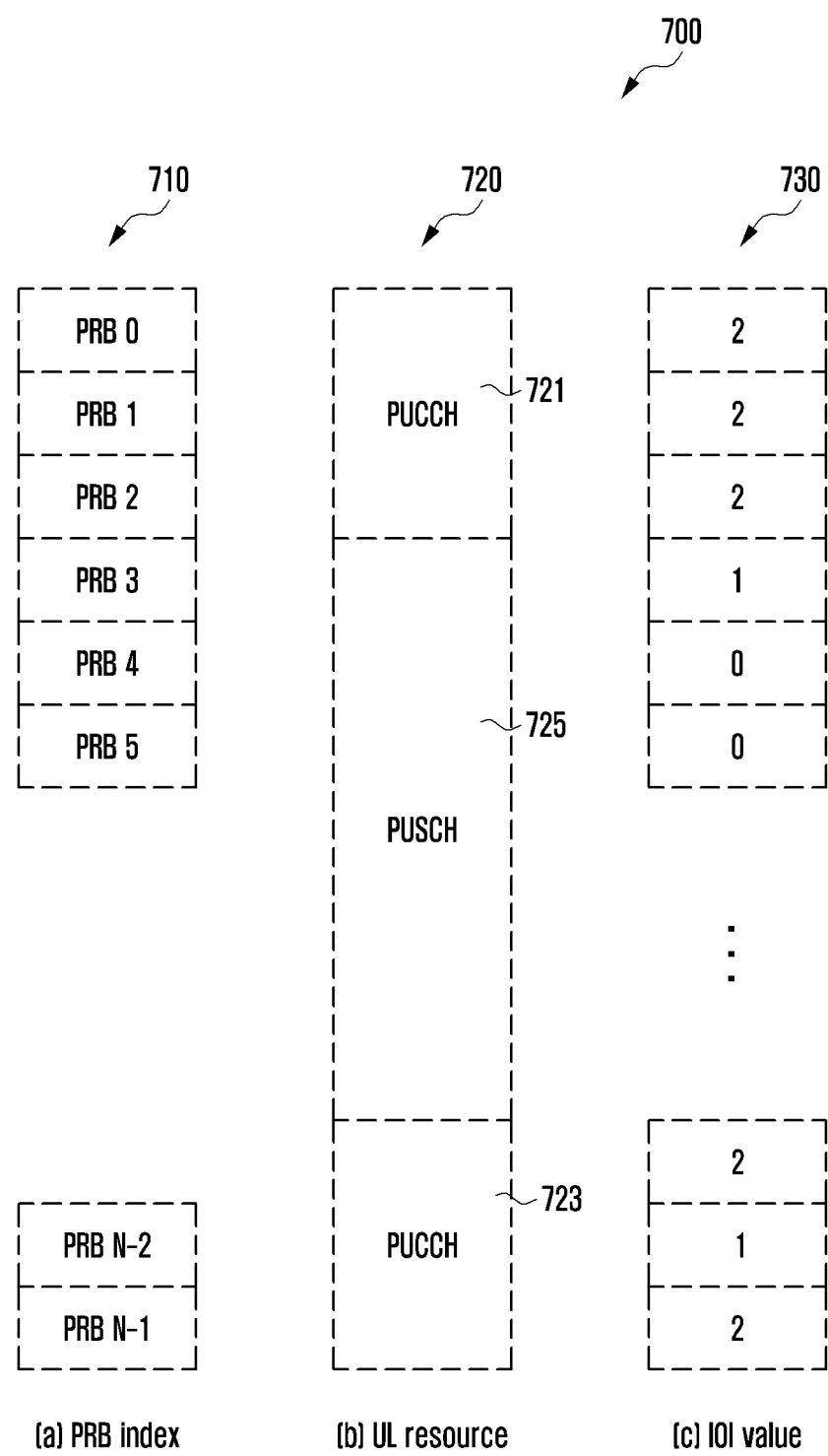
FIG. 7 is a diagram illustrating conventional interference information for each physical resource block (PRB) with respect to an uplink full-band.

FIG. 7 is a diagram illustrating conventional interference information for each physical resource block (PRB) with respect to an uplink full-band. According to a current LTE standard, IOI information may be generated with respect to an uplink full-band.

As illustrated in FIG. 7, in general, an uplink channel 720 is divided into a physical uplink shared channel (PUSCH) 725 and physical uplink control channels (PUCCHs) 721 and 723. The PUSCH 725 is a channel used for data transmission of a connected terminal. The PUCCHs 721 and 723 are channels used for transmission for a scheduling request (SR) of a connected terminal, ACK/NACK for downlink transmission, and channel state information (CSI).

In general, the PUCCHs 721 and 723 are allocated from the ends of a full band on both sides thereof for reception performance improvement. Transmission power of a terminal is separately configured according to a standard and operation purposes are different with respect to the two channels. In the case of the PUSCH 725, transmission power is dynamically configured for a high transfer rate based on an electric field level of each terminal, and higher transmission power is used compared to the PUCCHs in terms of a transmission format. In contrast, the PUCCH does not require high transmission power because a base station has an object of receiving the PUCCH normally with respect to a determined format. Accordingly, an interference level is different for each channel.

The IOI illustrated in FIGS. 6 and 7 includes the following two problems.

The first is that IOI information delivers information on the entire uplink band regardless of a channel. A PUCCH resource size (the number of PRBs) may vary depending on the number of terminals connected or may be configured as a different size depending on the type of base station, such as a macro/pico/femto cell. Accordingly, there is a case where PUCCH resource sizes of cells belonging to adjacent base stations are mutually unknown. As described above, it is important to separately check an interference level for each channel because power control operations between channels are different.

The second is that only IOI information of some resources needs to be valid even within each channel, but a surrounding cell cannot be separately notified of valid resource information through the existing IOI standard information. That is, an operation of ignoring IOI of a spurious band occurring due to hardware (HW) equipment, an area characteristic, etc. or a specific resource region by a scheduler operation cannot be performed. The HII illustrated in FIG. 4 has the aforementioned problems with IOI without any change.

Meanwhile, in order to solve the aforementioned problems, the disclosure discloses a method of extending the existing standard information so that IOI information is supported as two types of interference information.

Furthermore, the disclosure can support that an ICIC operation can be performed normally even between types of equipment of heterogeneous vendors by configuring a threshold for determining an interference level through higher layer signaling or a radio resource control (RRC) parameter.

The first type of interference information is described in detail with reference to FIGS. 10 and 11. The second type of interference information is described in detail with reference to FIGS. 12 to 14. An information extension method proposed in the disclosure may also be applied to the case of HII information.

Figure 8:
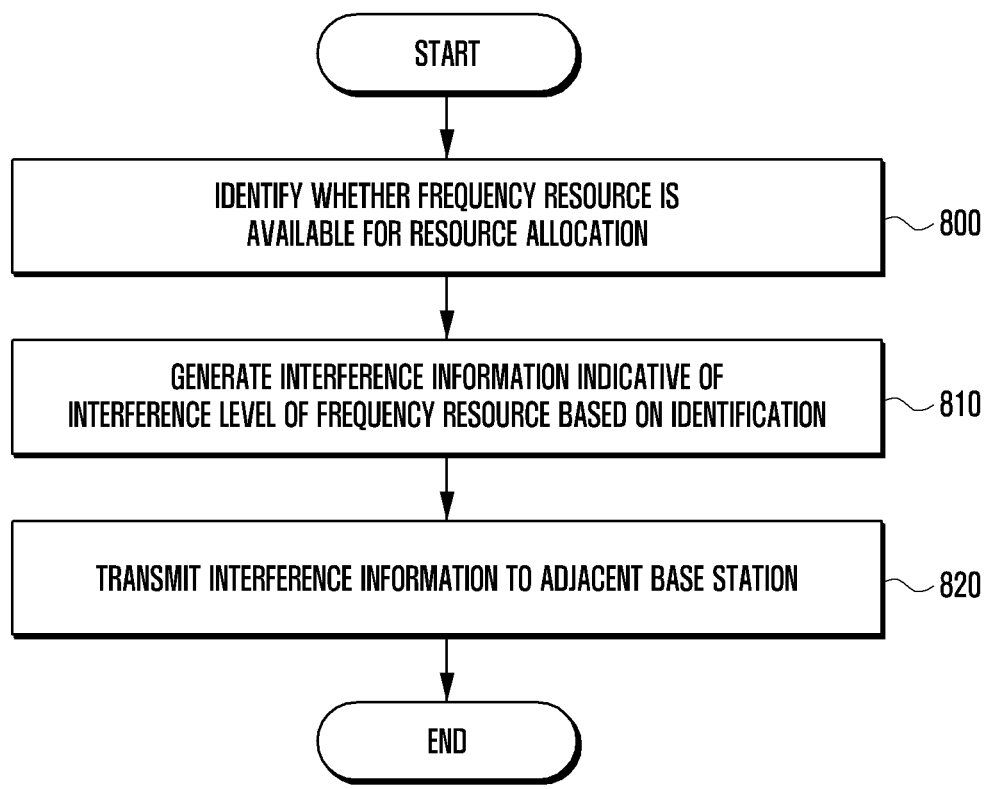
FIG. 8 is a flowchart illustrating an operation of transmitting, by a base station, interference information to an adjacent base station according to various embodiments of the disclosure.

FIG. 8 is a flowchart illustrating an operation of transmitting, by a base station, interference information to an adjacent base station according to various embodiments of the disclosure.

In operation 800, the base station identifies whether a frequency resource is available for resource allocation.

For example, to identify whether a frequency resource is available for resource allocation may include identifying an unused frequency resource or a frequency resource required to be excluded in terms of an operation.

For example, an unused frequency resource or a frequency resource required to be excluded may include a frequency resource included in a spurious band occurring due to hardware (HW) equipment, an area characteristic, etc. or a specific resource region configured to be not used by a scheduler operation.

In operation 810, the base station generates interference information indicative of an interference level of a frequency resource based on the identification in operation 800.

For example, if a frequency resource is used for resource allocation, an interference level of the frequency resource may be represented as two states of high interference/low interference, and more specifically, may be represented as three states of high interference, medium interference, and low interference.

For example, if a frequency resource is not used for resource allocation, interference information of the frequency resource may be a predetermined value.

Furthermore, interference information may be generated based on channel information corresponding to a frequency resource.

For example, if a channel corresponding to a frequency resource is a control channel, a value of interference information of the frequency resource may be identical with a value of interference information of a frequency resource not used for resource allocation. Such interference information may be said to be the first type of interference information, which is described in detail with reference to FIGS. 10 and 11.

For example, a value of interference information corresponding to an interference level may be different depending on the type of channel corresponding to a frequency resource. Such interference information may be said to be the second type of interference information, which is described in detail with reference to FIGS. 12 to 14.

In operation 820, the base station transmits the interference information to an adjacent base station.

Figure 9:
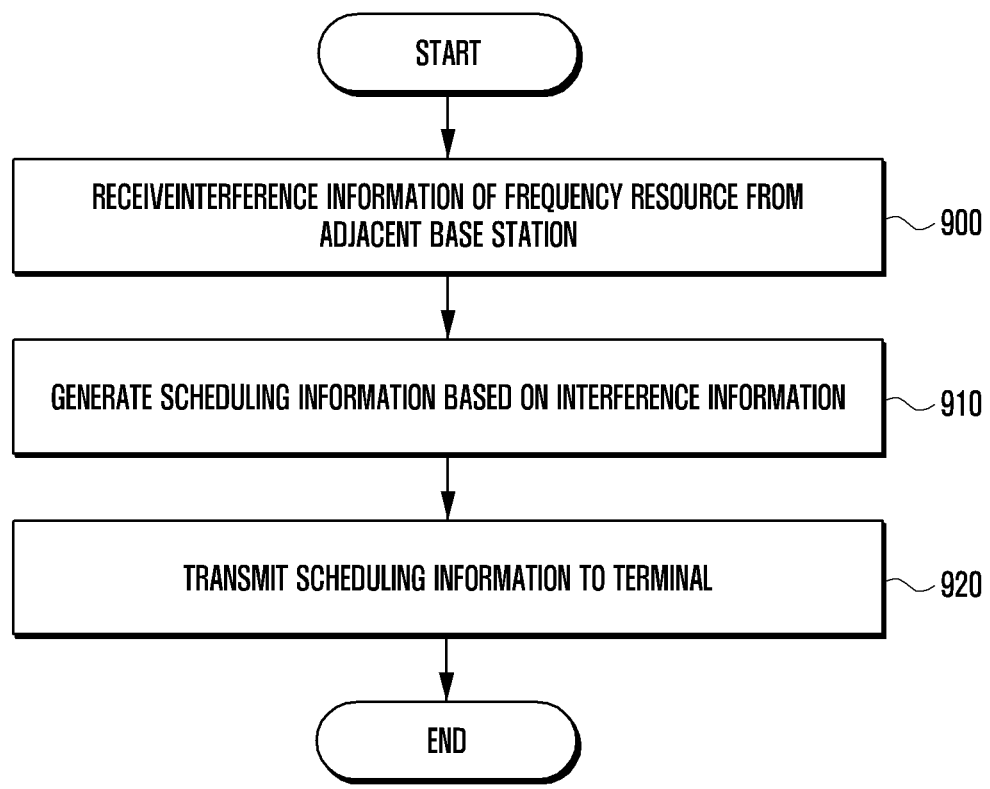
FIG. 9 is a flowchart illustrating an operation of receiving, by a base station, interference information from an adjacent base station according to various embodiments of the disclosure.

FIG. 9 is a flowchart illustrating an operation of receiving, by a base station, interference information from an adjacent base station according to various embodiments of the disclosure.

In operation 900, the base station receives, from the adjacent base station, interference information indicative of an interference level of a frequency resource.

For example, the interference information may be at least one of 2 bits or 3 bits.

In operation 910, the base station generates scheduling information based on the interference information received in operation 900.

For example, the base station may identify whether the frequency resource is available for resource allocation based on the received interference information.

Furthermore, the base station may identify channel information corresponding to the frequency resource based on the interference information.

For example, when a value of the interference information of the frequency resource is identical with a value of interference information of a frequency resource not used for resource allocation, the base station may identify that a channel corresponding to the frequency resource is a control channel.

For example, the base station may identify the type of channel corresponding to the frequency resource and the interference level of the frequency resource based on a value of the interference information of the frequency resource.

A base station according to various embodiments of the disclosure may check an interference level for each channel of each cell based on interference information, and can more accurately check interference of a neighbor cell by excluding a value of interference information of a specific resource in terms of an operation. In operation 920, the base station transmits the scheduling information to a terminal.

As described above, the disclosure extends the existing standard information so that IOI information supports the first type of IOI information and the second type of IOI information, and also supports that an ICIC operation can be performed normally even between pieces of equipment of heterogeneous vendors by configuring a threshold for determining an interference level as a RRC parameter for each type.

For example, the type of interference information may be configured through higher layer signaling. An interference level of a frequency resource may be identified based on at least one threshold preset for each type of interference information. For example, the threshold for determining an interference level may be configured through higher layer signaling or a radio resource control (RRC) parameter.

Table 2 below is an example of a new standard parameter for determining an IOI value according to the disclosure.

TABLE 2

| X2-UL-OverloadIndication-Config IES : : = | SEQUENCE { |
|---|---|
| x2-ioi-type | ENUMERATED {type1, type2}, |
| x2-ioi-dataThreshold1 | INTEGER(0..30), |
| x2-ioi-dataThreshold2 | INTEGER(0..30), |
| x2-loi-ctrlThreshold1 | INTEGER(..30), |
| x2-ioi-ctrlThreshold2 | INTEGER(0..30) |
| } | |

X2-UL-OverloadIndication-Config field descriptions x2-ioi-type
Parameter to determine the IOI types. Type1 supports up to ignore value in UL-InterferenceOverloadIndication-Item, and ignorable PRBs including PUCCH PRBs are mapped to ignore value. Meanwhile type 2 supports the whole values in UL-InterferenceOverloadIndication-Item, and IOI values in PUCCH region can be expressed separately.
x2-ioi-dataThreshold1
Higher threshold to determine the UL interference overload indication in the PUSCH region in dB. If IoT(interference over thermal) of the TABLE 2-continued PUSCH PRB exceeds or equals to this threshold, high-interference-data value is mapped to the corresponding PRB.
x2-ioi-dataThreshold2
Lower threshold to determine the UL interference overload indication in the PUSCH region in dB. If IoT(interference over thermal) of the PUSCH PRB is less than this threshold, low-interference-data value is mapped to the corresponding PRB. This threshold has to be less or equal to x2-ioi-dataThreshold1 for normal operation.
If IoT is between these two thresholds, midium-interference-data value is mapped to the corresponding PUSCH PRB.
x2-ioi-ctrlThreshold1
Higher threshold to determine the UL interference overload indication in the PUCCH region in dB. If IoT(interference over thermal) of the PUCCH PRB exceeds or equals to this threshold, high-interference-ctrl value is mapped to the corresponding PRB.
x2-ioi-ctrlThreshold2
Higher threshold to determine the UL interference overload indication in the PUCCH region in dB. If IoT(interference over thermal) of the PUCCH PRB is less than this threshold, low-interference-ctrl value is mapped to the corresponding PRB. This threshold has to be less or equal to x2-ioi-dataThreshold1 for normal operation. If IoT is between these two thresholds, midium-interference-ctrl value is mapped to the corresponding PUCCH PRB.

Figure 11:
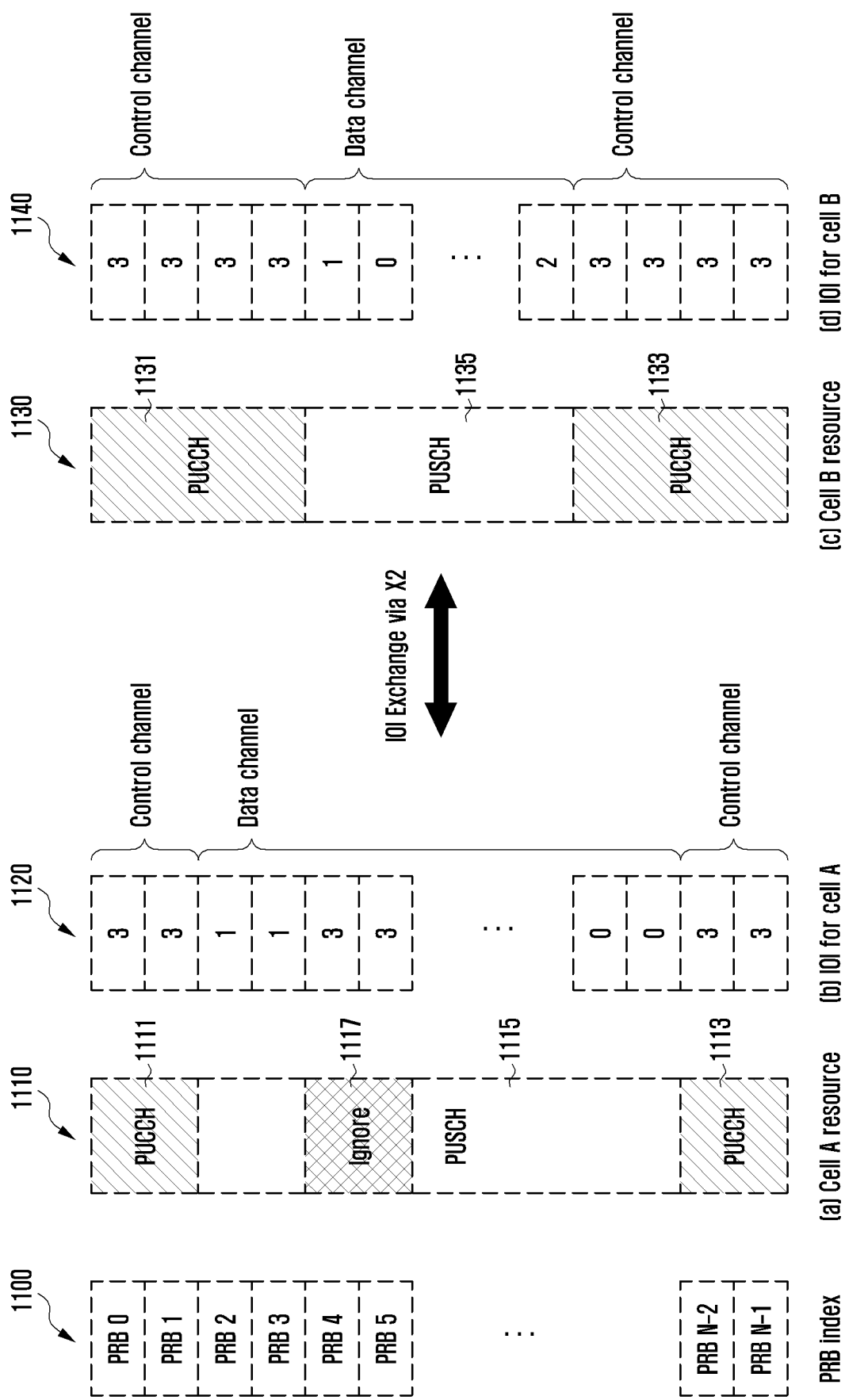
FIG. 11 is a diagram illustrating the first type of interference information for each PRB with respect to an uplink full-band according to various embodiments of the disclosure.

When an enum value of "x2-ioi-type" defined in Table 2 is configured as 0, that is, type1, IOI information may be generated as in FIG. 11. In this case, an 101 value is generated as an ignore value with respect to a PRB corresponding to a PUCCH and an unused PRB. When an enum value of "x2-ioi-type" defined in Table 2 is configured as 1, that is, type2, 101 information may be generated as in FIG. 13. In this case, with respect to a PRB corresponding to a PUCCH, IOI information may be generated based on a separate threshold (x2-ioi-ctrlThreshold1, x2-ioi-ctrlThreshold2) for the PUCCH. Furthermore, with respect to an unused PRB, identically, an IOI value is generated as an ignore value.

FIG. 10 is a diagram illustrating a configuration of the first type of interference information according to various embodiments of the disclosure.

In the first type of IOI information according to various embodiments of the disclosure, the size of interference may be configured as high, medium, or low with respect to each PRB. The size of interference may be configured as an IGNORE state with respect to a PRB to be excluded from an ICIC target.

As illustrated in FIG. 10, in the first type of IOI 1000, interference information of each PRB unit may be represented as 2 bits. 0 may mean high interference 1010, 1 may mean medium interference 1020, 2 may mean low interference 1030, and 3 may mean Ignore 1040 indicating that a corresponding PRB is an unused frequency resource or a frequency resource required to be excluded from an ICIC target in terms of an operation.

Table 3 below is an example of the first type of IOI information.

TABLE 3

| UL-InterferenceOverloadIndication : : = SEQUENCE (SIZE(1..maxnoofPRBS)) |
|---|
| OF UL-InterferenceOverloadIndication-Item |
| UL-InterferenceOverloadIndication-Item : : = ENUMERATED { |
|   high-interference,    // 00 : 0 |
|   medium-interference,    // 01 : 1 |
|   low-interference,    // 10 : 2 |
|   ignore,    // 11 : 3 |
| ... |
| } |

Furthermore, the first type of IOI information may be generated based on channel information corresponding to the frequency resource. When a channel corresponding to a frequency resource is a control channel, a value of interference information of the frequency resource may be identical with a value of interference information of a frequency resource not used for resource allocation. For example, as in FIG. 10 and Table 3, the IGNORE state may be added to 101 information as a value 3. With respect to a PUCCH PRB or a PRB to be excluded from an ICIC target, the IGNORE state may be configured.

The first type of IOI information has 2-bit IOI information per PRB, and has an advantage in that the same size of information as IOI information of the existing standard illustrated in FIG. 6 can be maintained. For a standard operation, a threshold for generating IOI information may be configured as a new standard parameter as in FIG. 12(a). For the definition of each standard parameter related to the first type of interference information, reference is made to Table 2.

FIG. 11 is a diagram illustrating the first type of interference information for each PRB with respect to an uplink full-band according to various embodiments of the disclosure.

FIG. 11 is a case where the enum value of "x2-ioi-type" defined in Table 2 is configured as 0, that is, type1, and illustrates how cells A and B belonging to different base stations generate the first type of 101 information according to a proposal of the disclosure.

In the first type of IOI information, when a channel corresponding to a frequency resource is a control channel, a value of interference information of a frequency resource may be identical with a value of interference information of a frequency resource not used for resource allocation.

For example, as illustrated in FIG. 11, with respect to a PUCCH PRB or a PRB to be excluded from an ICIC target, a value 3 indicative of the IGNORE state may be configured.

As illustrated in FIG. 11, in the case of the cell A, two PUCCH PRBs 1111, 1113 are configured at each of the ends of a band on both sides thereof, and two unused PUSCH PRBs 1117 are present in the middle of a PUSCH band.

In the case of the cell B, four PUCCH PRBs 1131, 1133 are configured at each of the ends of a band on both sides thereof, and an unused PUSCH PRB is not present in the middle of a PUSCH band.

Accordingly, with respect to a PRB corresponding to a PUCCH in the cells A and B and an unused PRB present in the cell A, an IOI value may be generated as an IGNORE value.

Figure 12:
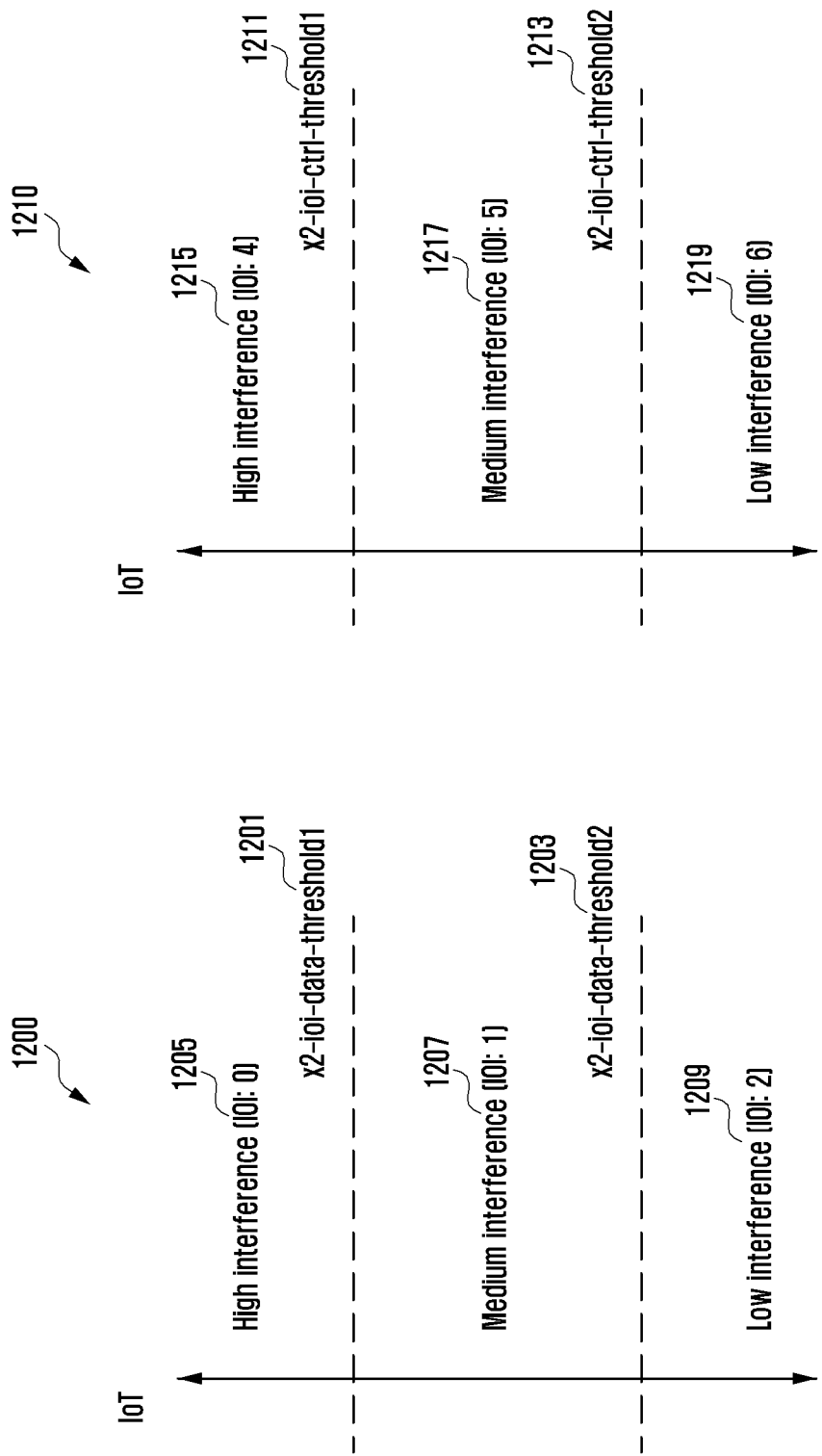
FIG. 12 is a diagram illustrating a value of the second type of interference information according to various embodiments of the disclosure.

FIG. 12 is a diagram illustrating a value of the second type of interference information according to various embodiments of the disclosure.

In the second type of interference information, interference sensitivity of a PUCCH and a PUSCH may be differently identified by differently configuring a value of interference information corresponding to an interference level depending on the type of channel corresponding to a frequency resource.

As illustrated in FIG. 12(a), two thresholds x2-ioi-data-Threshold1 1201 and x2-ioi-dataThreshold2 1203 for a PUSCH may be configured as in Table 2. Accordingly, IOI information for a PUSCH may be generated.

For example, as in FIG. 12(a), with respect to interference sensitivity of a PUSCH PRB, states of high interference 1205, medium interference 1207, and low interference 1209 are configured to correspond to values of 0, 1, and 2, respectively.

Furthermore, although not illustrated in FIG. 12, with respect to an unused PRB or a PRB to be excluded from an ICIC target, a value 3 indicative of the IGNORE state may be configured.

As illustrated in FIG. 12(b), separate two thresholds x2-ioi-ctrlThreshold1 1211 and x2-ioi-ctrlThreshold2 1213 for a PUCCH may be configured as in Table 2, and accordingly, IOI information for the PUCCH may be generated.

For example, as in FIG. 12(b), with respect to interference sensitivity of a PUCCH PRB, states of high interference 1215, medium interference 1217, and low interference 1219 are configured to correspond to values of 4, 5, and 6, respectively. Accordingly, interference sensitivity of a PUCCH and a PUSCH can be differently identified.

Accordingly, the second type of interference information has IOI information for each PRB increased to 3 bits, but has an advantage in that an interference level of a PUCCH channel can be separately checked compared to the first type of interference information. For the definition of each standard parameter related to the second type of interference information, reference is made to Table 2.

FIG. 13 is a diagram illustrating a configuration of the second type of interference information according to various embodiments of the disclosure.

In the second type of 101 information according to various embodiments of the disclosure, the size of interference may be configured as various interference levels of high, medium, and low with respect to each PRB. In particular, a value of interference information corresponding to an interference level may be differently configured depending on the type of channel corresponding to each PRB. With respect to a PRB to be excluded from an ICIC target, a predetermined value of interference information indicative of the IGNORE state may be configured.

As illustrated in FIG. 13, in the second type of IOI 1300, interference information of each PRB unit may be represented as 3 bits. 0 may mean high interference 1310 of a data channel, 1 may mean medium interference 1320 of a data channel, 2 may mean low interference 1330 of a data channel, 3 may mean Ignore 1340 indicating that corresponding PRB is an unused frequency resource or a frequency resource required to be excluded from an ICIC target in terms of an operation, 4 may mean high interference 1350 of a control channel, 5 may mean medium interference 1360 of a control channel, and 6 may mean low interference 1370 of a control channel. Table 4 below is an example of the second type of IOI information.

TABLE 4

```
UL-InterferenceOverloadIndication : : = SEQUENCE
(SIZE(1..maxnoofPRBs))
                              OF UL-InterferenceOverloadIndication-Item
UL-InterferenceOverloadIndication-Item : : = ENUMERATED {
    high-interference- data,        // 000 : 0
    medium-interference-data,       // 001 : 1
    low-interference-data,          // 010 : 2
    ignore,                         // 11 : 3
    high-interference- ctrl.        // 100 : 4
    medium-interference-ctrl,       // 101 : 5
    low-interference-ctrl,          // 110 : 6
    ...
}
```

Figure 14:
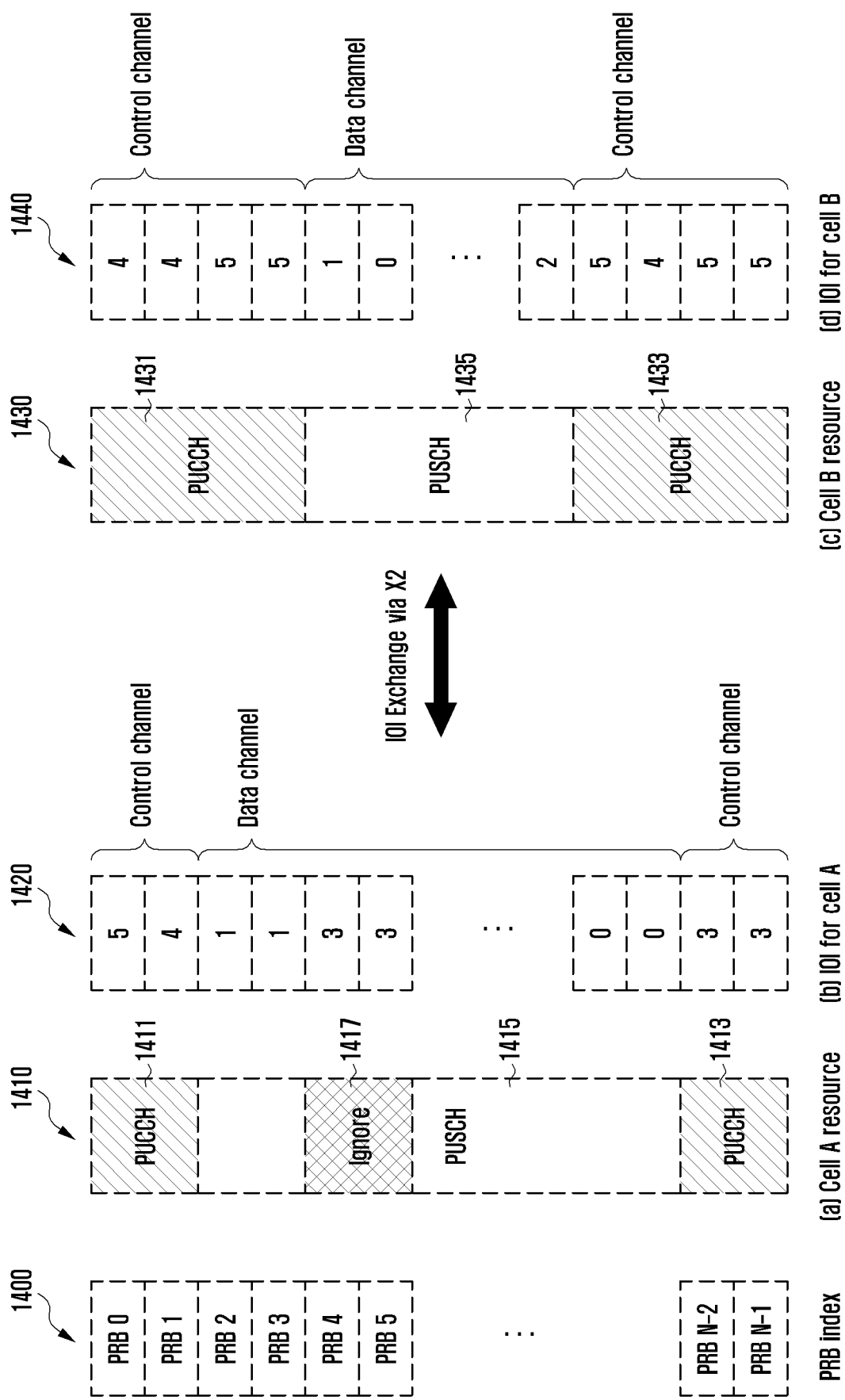
FIG. 14 is a diagram illustrating the second type of interference information for each PRB with respect to an uplink full-band according to various embodiments of the disclosure.

FIG. 14 is a diagram illustrating the second type of interference information for each PRB with respect to an uplink full-band according to various embodiments of the disclosure. FIG. 14 illustrates how cells A and B belonging to different base stations generate the second type of 101 information according to a proposal of the disclosure, if the enum value of "x2-ioi-type" defined in Table 2 is configured as 1, that is, type2.

In the second type of IOI information, a value of interference information corresponding to an interference level of high, medium, or low may be differently configured depending on the type of channel corresponding to a frequency resource. With respect to an unused PRB or a PRB to be excluded from an ICIC target, a predetermined value of interference information indicative of the Ignore state may be configured.

As illustrated in FIG. 14, in the cell A, two PUCCH PRBs 1411, 1413 are configured at each of the ends of a band on both sides thereof, and two unused PUSCH PRBs 1417 are present in the middle of a PUSCH band. In the cell B, four PUCCH PRBs 1431, 1433 are configured at each of the ends of a band on both sides thereof, and an unused PUSCH PRB is not present in the middle of a PUSCH band.

As illustrated in FIG. 14, in the cells A and B, with respect to a PUSCH PRB, a value 0, 1, or 2 may be configured based on an interference level. With respect to a PRB to be excluded from an ICIC target among PUSCH PRBs, a value 3 indicative of the IGNORE state may be configured. With respect to a PUCCH PRB, a value 4, 5, or 6 may be configured based on an interference level.

That is, a base station can differently identify interference sensitivity of a PUCCH and a PUSCH based on the second type of interference information, and can be aware of an unused PRB or a PRB to be excluded from an ICIC target.

Meanwhile, in order to generate accurate information and prevent an abnormal operation between different types of vendor equipment, standardization is required as in a proposal of the disclosure. In particular, in a 5G communication system, the standardization of an IOI message becomes more important because different types of vendor equipment between a central unit (CU) and a distributed unit (DU) can be used. For example, if a medium access control (MAC) scheduler present in the DU transmits, to the CU in which an X2 interface is present, an IOI value as another value not the value 0, 1, or 2 defined in the current standard of Table 1, a CU of another vendor may identify the IOI value as an erroneous value and discard an IOI message. Alternatively, in terms of an interface implementation, an IOI value may be defined as 2 bits, and a 4 value or higher itself may not be supported. In order to prevent such a collision, in the disclosure, there emerges the necessity to make implementations between types of vendor equipment identical with one another through standardization, rather than leaving an extended IOI message as an implementation issue.

Meanwhile, if the IOI information of FIGS. 6 and 7 including even IOI information for a PUCCH resource region and an unwanted PUSCH resource region is used, terminal transmission power control or resource allocation may be undesirably performed according to an ICIC algorithm because even unnecessary information is included.

Accordingly, the first type of interference information illustrated in FIG. 11 or the second type of interference information illustrated in FIG. 12, that is, extended interference information proposed in the disclosure, is provided in the state in which a data channel and a control channel are divided and values corresponding to interference levels are separated and provided for each channel. Accordingly, an interference level can be checked for each channel of each cell, and a surrounding cell can be separately notified of an unused PRB or a PRB to be excluded from an ICIC target.

In the first type of interference information or the second type of interference information according to various embodiments of the disclosure, a PRB region whose channel information for each PRB and IOI value may be negligible can be identified. Accordingly, interference information can be more accurately shared between cells belonging to different base stations. A data transfer rate and coverage can be improved through an interference control and resource allocation operation of a scheduler in which the interference information is taken into consideration.

In particular, in a 5G communication system, if several frequency bandwidth parts are operated, PUCCH channels are present at various positions of a frequency band. If the disclosure is applied, a PUSCH and a PUCCH can be distinguished in a way to be extensible even in the 5G communication system. Furthermore, interference of a neighbor cell can be more accurately checked within the same channel because an IOI value of a specific resource is excluded in terms of an operation even. Accordingly, the disclosure may assist a performance improvement effect of an ICIC algorithm in a PUSCH channel, that is, performance improvement of a weak electric field terminal. Furthermore, in the case of a PUCCH channel, an effective interference avoidance or interference reduction operation can be performed so that PUCCH reception performance of another cell is improved by checking whether high interference is applied due to overlap with a PUSCH channel of another cell.

Figure 15:
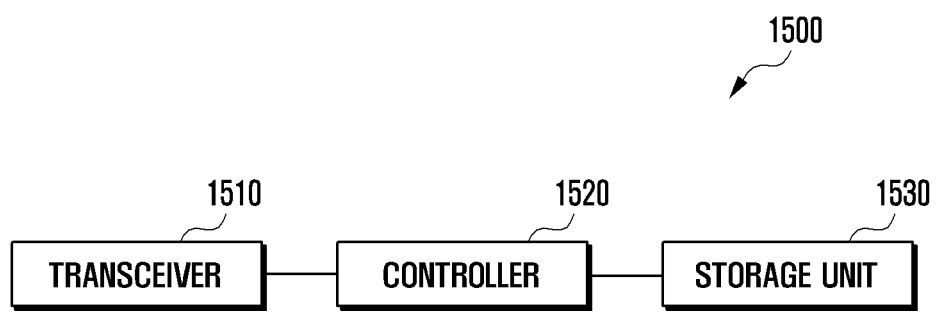
FIG. 15 is a diagram illustrating a block diagram of a base station that transmits interference information according to various embodiments of the disclosure.

FIG. 15 is a diagram illustrating a block diagram of a base station that transmits interference information according to various embodiments of the disclosure.

As illustrated in FIG. 15, the base station according to various embodiments may include a transceiver 1510, a controller 1520 and a storage unit 1530. In the disclosure, the controller 1520 may be defined as a circuit- or application-specific integrated circuit or at least one processor.

Hereinafter, the elements are sequentially described.

The transceiver 1510 according to various embodiments may transmit and receive, to and from another network entity, signals, information, data, etc. according to various embodiments of the disclosure.

For example, the transceiver 1510 may transmit, to another base station, interference information indicative of an interference level of a frequency resource related to a cell included in the base station 1500.

Furthermore, the transceiver 1510 may transmit system information to a terminal, and may transmit a synchronization signal or a reference signal.

The controller 1520 according to various embodiments of the disclosure may control an overall operation of the base station according to various embodiments proposed in the disclosure.

For example, the controller 1520 according to various embodiments may identify whether a frequency resource is available for resource allocation.

For example, a unit of a frequency resource may be a physical resource block (PRB).

In the disclosure, to identify whether a frequency resource is available for resource allocation may include identifying an unused frequency resource or a frequency resource required to be excluded in terms of an operation. For example, an unused frequency resource or a frequency resource required to be excluded may include a frequency resource included in a spurious band occurring due to hardware (HW) equipment, an area characteristic, etc. or a specific resource region configured to be not used by a scheduler operation.

The controller 1520 according to various embodiments of the disclosure may generate interference information indicative of an interference level of a frequency resource based on whether a frequency resource is available for resource allocation.

For example, if a frequency resource is used for resource allocation, an interference level of a frequency resource may be represented as two state of high interference/low interference, and more specifically, may be represented as three states of high interference, medium interference, and low interference.

For example, an interference level of a frequency resource may be identified based on at least one threshold configured through higher layer signaling.

For example, if a frequency resource is not used for resource allocation, interference information of a frequency resource may be a predetermined value.

Furthermore, interference information may be generated based on channel information corresponding to a frequency resource.

For example, if a channel corresponding to a frequency resource is a control channel, a value of interference information of the frequency resource may be identical with a value of interference information of a frequency resource not used for resource allocation.

For example, a value of interference information corresponding to an interference level may be different depending on the type of channel corresponding to a frequency resource.

The controller 1520 according to various embodiments may control the transceiver to transmit interference information to an adjacent base station.

The storage unit 1530 according to various embodiments may store at least one of information transmitted and received through the transceiver 1510 and information generated through the controller 1520.

For example, the storage unit 1530 may include a memory. The memory may store data, such as a basic program for an operation of the base station, an application program, or configuration information according to various embodiments of the disclosure. Furthermore, the processor may perform various operations by using various programs, content, data, etc. stored in the memory.

Figure 16:
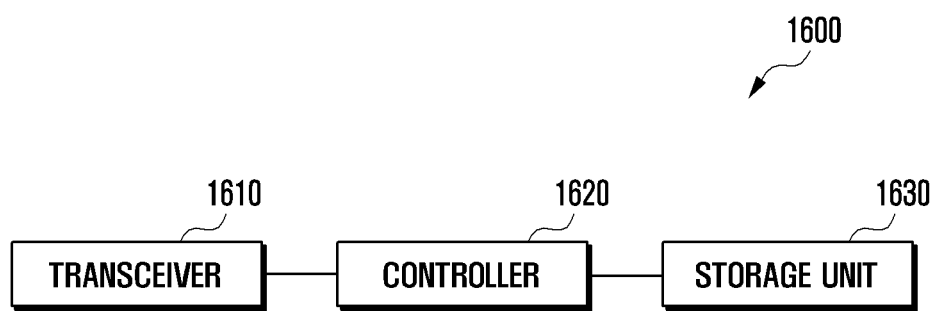
FIG. 16 is a diagram illustrating a block diagram of a base station that receives interference information according to various embodiments of the disclosure.

FIG. 16 is a diagram illustrating a block diagram of a base station that receives interference information according to various embodiments of the disclosure.

As illustrated in FIG. 16, the base station according to various embodiments may include a transceiver 1610, a controller 1620 and a storage unit 1630. In the disclosure, the controller 1620 may be defined as a circuit- or application-specific integrated circuit or at least one processor.

Hereinafter, the elements are sequentially described.

The transceiver 1610 according to various embodiments may transmit and receive, to and from another network entity, signals, information, data, etc. according to various embodiments of the disclosure.

For example, the transceiver 1610 may receive, from an adjacent base station, interference information indicative of an interference level of a frequency resource related to a cell included in an adjacent base station.

For example, the transceiver 1610 may transmit system information to a terminal, and may transmit a synchronization signal or a reference signal.

Furthermore, the transceiver 1610 may transmit, to a terminal, scheduling information generated based on interference information received from an adjacent base station.

The controller 1620 according to various embodiments of the disclosure may control an overall operation of the base station according to various embodiments proposed in the disclosure.

For example, the controller 1620 may control a signal flow between the blocks so that the operations according to the flowchart are performed.

The controller 1620 according to various embodiments of the disclosure may control the transceiver to receive, from an adjacent base station, interference information indicative of an interference level of a frequency resource.

For example, a base station according to various embodiments of the disclosure may receive, from another base station, interference information indicative of an interference level of a frequency resource in order to check an uplink interference level experienced by cells within the other base station.

For example, a unit of a frequency resource may be a physical resource block (PRB).

The controller 1620 according to various embodiments of the disclosure may generate scheduling information based on interference information.

Scheduling information according to various embodiments of the disclosure may include information used to schedule uplink transmission for a terminal.

For example, scheduling information may include information to coordinate uplink output power of a terminal or information to allocate resources to different resource regions between cells.

A base station according to various embodiments of the disclosure may check an interference level for each channel of each cell based on interference information received from an adjacent base station, and can more accurately check interference of a neighbor cell by excluding an IOI value of a specific resource even within the same channel in terms of an operation.

For example, a base station may identify whether the frequency resource is available for resource allocation based on received interference information. Furthermore, the base station may identify channel information corresponding to the frequency resource based on the interference information.

For example, when a value of the interference information of the frequency resource is identical with a value of interference information of a frequency resource not used for resource allocation, the base station may identify that a channel corresponding to the frequency resource is a control channel.

For example, a base station may identify the type of channel corresponding to the frequency resource and the interference level of the frequency resource based on a value of the interference information of the frequency resource. Accordingly, the base station according to various embodiments of the disclosure can more accurately share interference information between cells belonging to different base stations, and can improve a data transfer rate and coverage through an interference control and resource allocation operation of a scheduler in which the interference information has been taken into consideration.

The controller 1620 according to various embodiments of the disclosure may control the transceiver to transmit scheduling information to a terminal.

The storage unit 1630 according to various embodiments of the disclosure may store at least one of information transmitted and received through the transceiver 1610 and information generated through the controller 1620.

For example, the storage unit 1630 may include a memory. The memory may store data, such as a basic program for an operation of the base station, an application program, or configuration information, according to various embodiments of the disclosure. Furthermore, the processor may perform various operations by using various programs, content, data, etc. stored in the memory.

Figure 17:
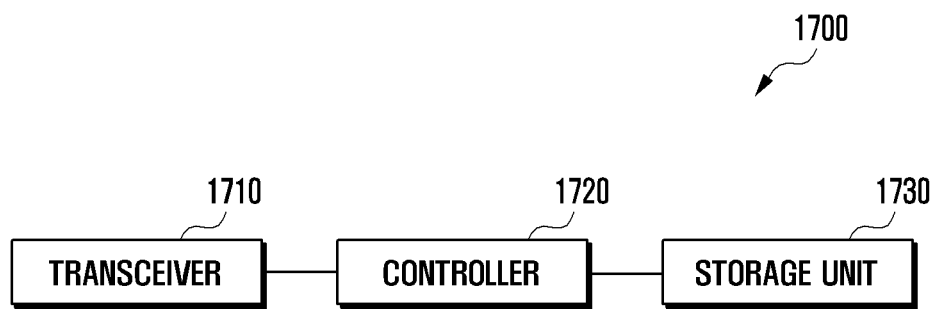
FIG. 17 is a diagram illustrating a block diagram of a terminal that receives scheduling information related to interference information according to various embodiments of the disclosure.

FIG. 17 is a diagram illustrating a block diagram of a terminal that receives scheduling information related to interference information according to various embodiments of the disclosure.

As illustrated in FIG. 17, the terminal according to various embodiments may include a transceiver 1710, a controller 1720 and a storage unit 1730. In the disclosure, the controller 1720 may be defined a circuit- or application-specific integrated circuit or at least one processor.

Hereinafter, the elements are sequentially described.

The transceiver 1710 according to various embodiments of the disclosure may transmit and receive, to and from another network entity, signals, information, data, etc. according to various embodiments of the disclosure.

For example, the transceiver 1710 may receive system information from a base station, and may receive a synchronization signal or a reference signal.

Furthermore, the transceiver 1710 may receive scheduling information from a base station.

For example, scheduling information may include information to coordinate uplink output power of the terminal or information to allocate resources to different resource regions between cells.

For example, scheduling information received from a base station may be generated by taking into consideration an uplink interference level experienced by cells within different base stations.

In this case, the base station may check an interference level for each channel of each cell based on interference information received from another base station, and can more accurately check interference of a neighbor cell by excluding an IOI value of a specific resource even within the same channel in terms of an operation.

The controller 1720 according to various embodiments of the disclosure may control an overall operation of the terminal according to various embodiments proposed in the disclosure.

For example, the controller 1720 according to various embodiments may reduce an ICI level by coordinating uplink output power based on scheduling information received from a base station.

Furthermore, the controller 1720 according to various embodiments can avoid mutual interference by performing uplink transmission by using different resource regions between cells based on the scheduling information received from the base station.

For example, the controller 1720 may control a signal flow between the blocks so that the operations according to the flowchart are performed.

The storage unit 1730 according to various embodiments may store at least one of information transmitted and received through the transceiver 1710 and information generated through the controller 1720.

For example, the storage unit 1730 may include a memory. The memory may store data, such as a basic program for an operation of the terminal, an application program, or configuration information, according to various embodiments of the disclosure. Furthermore, the processor may perform various operations by using various programs, content, data, etc., stored in the memory.

In the aforementioned detailed embodiments of the disclosure, the components included in the disclosure have been expressed in the singular or plural form depending on a proposed detailed embodiment. However, the singular or plural expression has been selected suitably for a situation proposed for convenience of description, and the disclosure is not limited to singular or plural components. Although a component has been expressed in the plural form, it may be configured in the singular form. Although a component has been expressed in the singular form, it may be configured in the plural form.

Although the detailed embodiments have been described in the detailed description of the disclosure, the disclosure may be modified in various ways without departing from the scope of the disclosure. Accordingly, the scope of the disclosure should not be limited to the aforementioned embodiments, but should be defined by not only the claims, but equivalents thereof.

According to various embodiments of the disclosure, a base station receiving interference information in a wireless communication system includes a transceiver; and at least one processor. The processor may control the transceiver to receive interference information indicative of an interference level of a frequency resource from an adjacent base station, may generate scheduling information based on the interference information, may control the transceiver to transmit the scheduling information to a terminal, and may identify whether a frequency resource is available for resource allocation based on the received interference information.

In this case, the base station may identify channel information corresponding to the frequency resource based on the interference information.

Furthermore, when the value of the interference information of the frequency resource is identical with a value of interference information of a frequency resource not used for resource allocation, the base station may identify that a channel corresponding to the frequency resource is a control channel.

Furthermore, the base station may identify the type of channel corresponding to the frequency resource and the interference level of the frequency resource, based on the value of the interference information of the frequency resource.

Furthermore, the interference information may be at least one of 2 bits or 3 bits.

Various embodiments of the disclosure and the terms used in the embodiments are not intended to limit the technology described in the disclosure to a specific embodiment, but should be construed as including various changes, equivalents and/or alternatives of a corresponding embodiment. Regarding the description of the drawings, similar reference numerals may be used in similar components. An expression of the singular number may include an expression of the plural number unless clearly defined otherwise in the context. In the disclosure, an expression, such as "A or B," "at least one of A and/or B," "A, B or C" or "at least one of A, B and/or C," may include all of possible combinations of listed items together. Expressions, such as "a first," "a second," "the first" or "the second," may modify corresponding components regardless of its sequence or importance, and are used to only distinguish one component from the other component and do not limit corresponding components. When it is described that one (e.g., a first) component is "(functionally or communicatively) connected to" or "coupled with" the other (e.g., a second) component, one component may be directly connected to the other component or may be connected to the other component through another component (e.g., a third component).

The term "module" used in the disclosure includes a unit configured as hardware, software or firmware, and may be interchangeably used with a term, such as logic, a logical block, a part or a circuit. The module may be an integrated part, a minimum unit to perform one or more functions, or a part thereof. For example, the module may be configured as an application-specific integrated circuit (ASIC).

Various embodiments of the disclosure may be implemented as software (e.g., a program) including instructions stored in machine (e.g., computer-readable storage media (e.g., an internal memory or an external memory). A device is an apparatus which may invoke a stored instruction from the storage media and may operate in response to the invoked instruction, and may include a base station or a terminal according to various embodiments of the disclosure. When the instruction is executed by a processor (e.g., the controller 1520, 1620, 1720 in the device drawing), the processor may perform a function, corresponding to the instruction, directly or by using other components under the control of the processor. The instruction may include a code generated or executed by a compiler or an interpreter.

The machine-readable storage media may be provided in the form of a non-transitory storage medium. In this case, "non-transitory" merely means that the storage media do not include a signal and are tangible, and does not distinguish between cases where data is semi-permanently or temporally stored in the storage media.

The method according to various embodiments disclosed in the disclosure may be included in a computer program product and provided. The computer program product may be traded as a product between a seller and a buyer. The computer program product may be distributed in the form of a device-readable storage medium (e.g., a compact disc read only memory (CD-ROM)) or through an app store (e.g., PlayStore™) online. In the case of the online distribution, at least some of the computer program product may be at least temporarily stored or provisionally generated in storage media, such as a memory in a server of a manufacturer, a server of an app store or a relay server.

Each of the components (e.g., modules or programs) according to various embodiments may consist of a single entity or a plurality of entities. Some of the aforementioned corresponding sub-elements may be omitted or other sub-elements may be further included in various embodiments. Alternatively or additionally, some components (e.g., modules or programs) may be integrated into a single entity. The single entity may perform a function performed by each of corresponding components before they are integrated identically or similarly. Operations performed by a module, a program or other components according to various embodiments may be executed sequentially, in parallel, repeatedly or heuristically, or at least some operations may be executed in different orders or may be omitted, or other operations may be added.

INDUSTRIAL APPLICABILITY

Various embodiments of the disclosure may be used for wireless communication.

SEQUENCE LIST PRE-TEXT

1500: second base station, 1600: first base station 1700: terminal

The invention claimed is:

1. A method of transmitting, by a base station, interference information in a wireless communication system, the method comprising:
   identifying whether a frequency resource is required to be excluded from an inter-cell interference coordination (ICIC) operation;
   generating interference information indicative of an interference level of the frequency resource based on the identification; and
   transmitting the interference information to an adjacent base station,
   wherein the interference information is generated based on a type of channel corresponding to the frequency resource,
   wherein, in case that the frequency resource is required to be excluded from the ICIC operation, the interference information has a predetermined value indicative of an ignore state, and
   wherein a value of the interference information is identical with the predetermined value indicative of the ignore state, based on a type of channel corresponding to the frequency resource being a control channel.

2. The method of claim 1, wherein the value of the interference information is different based on the type of channel corresponding to the frequency resource.

3. The method of claim 1, wherein the interference level of the frequency resource is identified based on at least one threshold configured through higher layer signaling.

4. A method of receiving, by a base station, interference information in a wireless communication system, the method comprising:
   receiving, from an adjacent base station, interference information indicative of an interference level of a frequency resource;
   generating scheduling information based on the interference information; and
   transmitting the scheduling information to a user equipment,
   wherein a type of channel corresponding to the frequency resource is able to be identified based on the interference information,
   wherein in case that the frequency resource is required to be excluded from an inter-cell interference coordination (ICIC) operation, the interference information has a predetermined value indicative of an ignore state,
   wherein the type of channel corresponding to the frequency resource being a control channel is able to be identified, based on that a value of the interference information of the frequency resource is identical with a predetermined value indicative of an ignore state of interference information of a frequency resource required to be excluded from the ICIC operation, and
   wherein whether a frequency resource is available for resource allocation is able to be identified based on the interference information.

5. The method of claim 4, wherein the type of the channel corresponding to the frequency resource and the interference level of the frequency resource are able to be identified based on the value of the interference information of the frequency resource.

6. The method of claim 4, wherein the interference information is at least one of 2 bits or 3 bits.

7. A base station transmitting interference information in a wireless communication system, comprising:
a transceiver; and
at least one processor;
configured to:
identify whether a frequency resource is required to be excluded from an inter-cell interference coordination (ICIC) operation,
generate interference information indicative of an interference level of the frequency resource based on the identification, and
control the transceiver to transmit the interference information to an adjacent base station,
wherein the interference information is generated based on a type of channel corresponding to the frequency resource,
wherein, in case that the frequency resource is required to be excluded from the ICIC operation, the interference information has a predetermined value indicative of an ignore state, and
wherein a value of the interference information is identical with the predetermined value indicative of the ignore state, based on the type of channel corresponding to the frequency resource being a control channel.

8. The base station of claim 7, wherein the value of the interference information is different based on the type of channel corresponding to the frequency resource.

9. The base station of claim 7, wherein the interference level of the frequency resource is identified based on at least one threshold configured through higher layer signaling.

* * * * *